United States Patent
Laakmann

[11] 3,742,234
[45] June 26, 1973

[54] HIGH SPEED SMALL DEFLECTION INTERLACE MIRROR

[75] Inventor: Peter Laakmann, Los Angeles, Calif.

[73] Assignee: Hughes Aircraft Company, Culver City, Calif.

[22] Filed: June 23, 1971

[21] Appl. No.: 155,955

[52] U.S. Cl............ 250/235, 178/7.6, 350/6, 350/295
[51] Int. Cl. ............................................. H01j 5/16
[58] Field of Search................. 250/234, 235, 236; 350/6, 7, 285; 178/7.6

[56] References Cited
UNITED STATES PATENTS

| | | | |
|---|---|---|---|
| 3,071,036 | 1/1963 | McKnight | 250/235 |
| 3,080,484 | 3/1963 | Hulett | 250/235 |
| 3,166,683 | 1/1965 | Gootherts | 350/6 |
| 3,532,408 | 10/1970 | Dostal | 350/6 |
| 3,020,414 | 2/1962 | McKnight | 250/235 |
| 3,386,786 | 6/1968 | Kaisler | 250/235 |

Primary Examiner—James W. Lawrence
Assistant Examiner—D. C. Nelms
Attorney—W. H. MacAllister, Jr. and Walter J. Adam

[57] ABSTRACT

A small deflection scanning mirror having a sufficiently high resonant frequency so as to be suitable for high speed interlace operation. The mirror structure includes a balanced pair of mirror surfaced plates arranged parallel to each other on opposite sides of a mounting plate and with a honeycomb core therebetween formed of an array of stacks of linear motion transducers or motors. Each stack may have selected numbers of the transducers connected either in series or in parallel or in series-parallel combinations. The stacks in the array are arranged to develop a deflection profile over the plates chosen for minimum bending of the surfaces while providing the required total deflection in response to drive waveforms of proper polarities. Because the drive is applied in a distributed manner, resonant frequency considerations apply mainly to the crystal structure of the stacks and the amount of distributed mass loading from the mirror plates, and the mirror size or total mass is no longer a significant resonant consideration.

11 Claims, 9 Drawing Figures

PATENTED JUN 26 1973

Peter Laakmann,
INVENTOR.
BY.

Walter J. Adam
ATTORNEY.

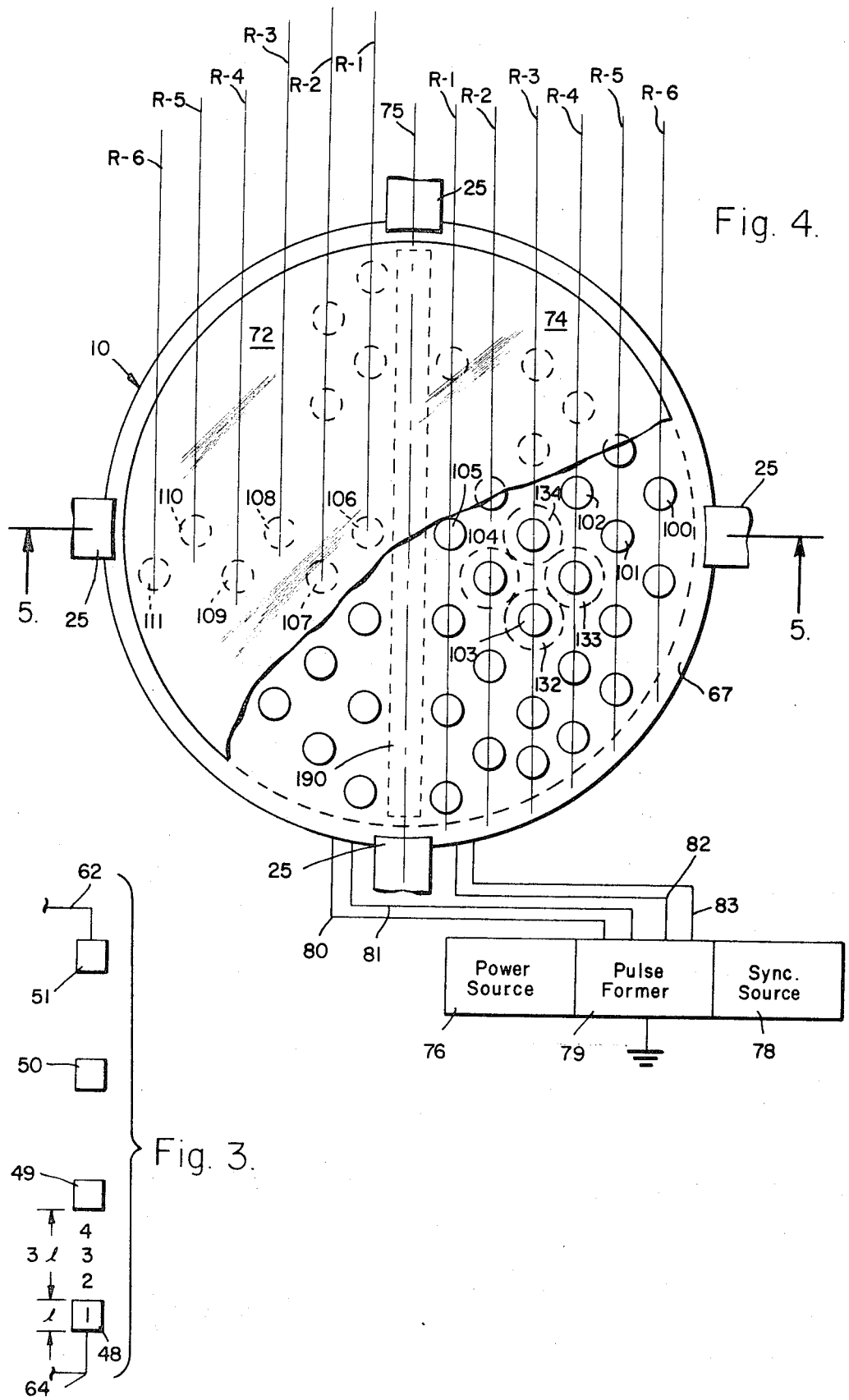

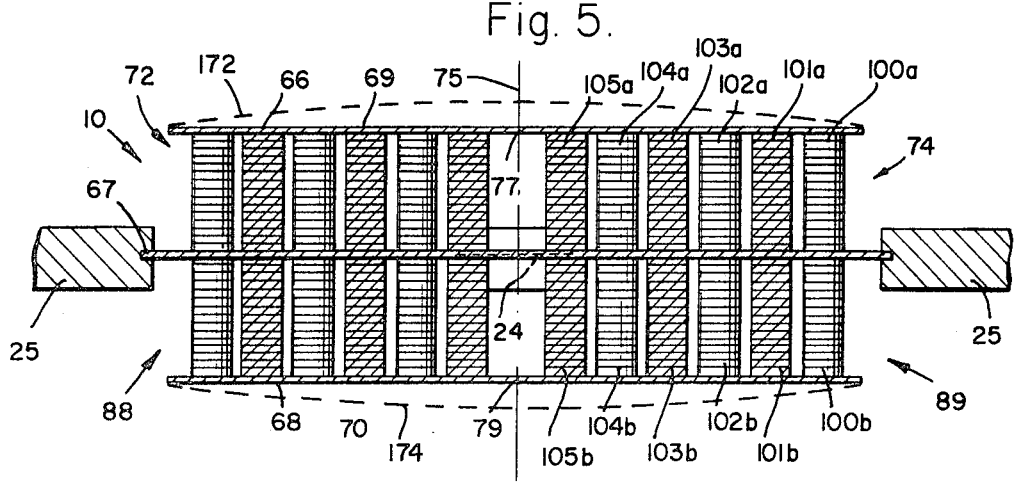
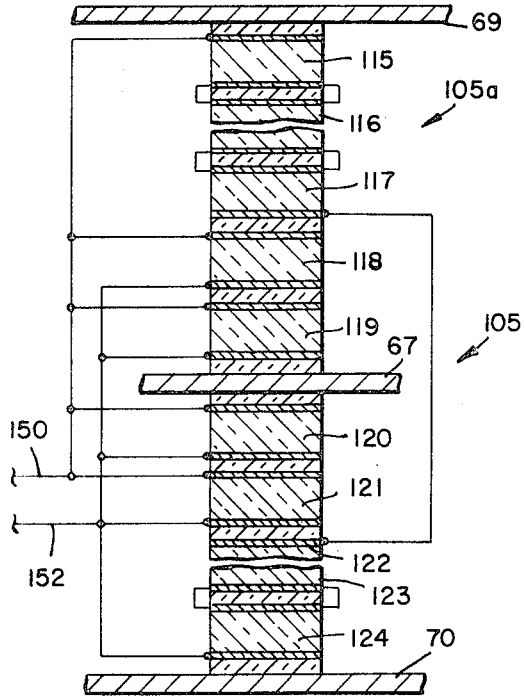
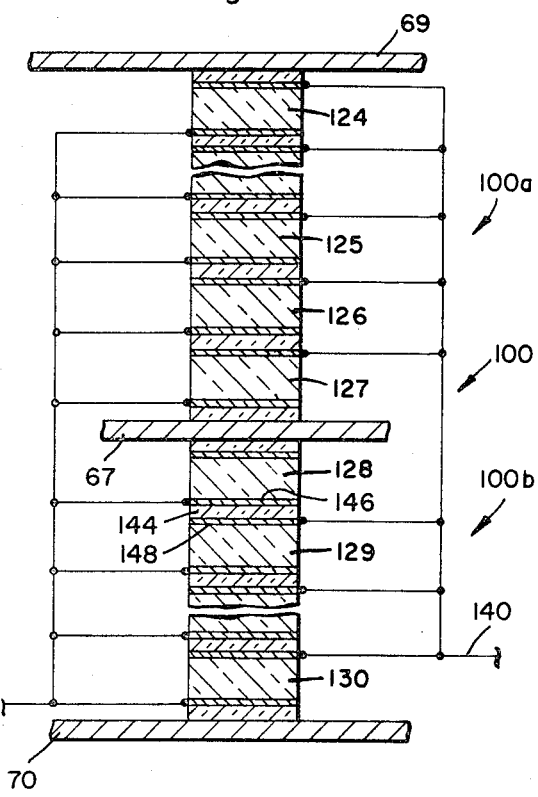

HIGH SPEED SMALL DEFLECTION INTERLACE MIRROR

BACKGROUND OF THE INVENTION

1. Field of the Invention

This invention relates to scanning mirrors and particularly to a high speed small deflection mirror suitable for use in mechanical interlace operations such as for scanning detector arrays.

2. Description of the Prior Art

In systems requiring high speed optical scanning such as in infrared systems where rapid mechanical interlace scanning of a detector array is required, it has been found to be difficult to move large mechanical mirror structures through very small angles at very high rates such as in kilocycle range. For a selected interlace such as a two-to-one or four-to-one interlace, the mirror which receives energy signals from the scene being viewed is required to move through relatively small angles at a very high rate. One of the difficulties encountered is that the resonant frequency of the driver mirror must be much higher than the drive frequency in order to avoid dynamic optical abberations. A second consideration is that the interlace device or mirror must not exert forces on the supports, as otherwise the resonant frequency of the supports must be also very high. For some high frequency scanning operations, the required resonant frequency may be as high as 10 kilocycles and above, which resonant frequencies are not generally found in normal scanning structures.

SUMMARY OF THE INVENTION

Briefly, a high speed small deflection interlace type mirror, in accordance with the principles of the invention, is provided with the drive applied in a distributed, balanced and graduated manner to develop a relatively high resonant frequency structure while exerting substantially no dynamic forces onto the support. The structure, which has a balanced configuration, includes two parallel mirror plates that form the faces of a honeycomb or sandwich type structure with a central mounting plate positioned at a neutral axis between and parallel to the two parallel mirror plates. The core of the structure is simulated by the use of an array of linear motion transducers or drive motors such as electro or magnetostrictive transducers excited by properly selected high voltage square waves. The array includes stacks of the transducers symmetrically arranged on opposite sides of the mounting plate to provide a balanced structure. The deflection profile over the mirror may be shaped by variable excitation voltages or by variable numbers of energizable transducers in each of the stacks. Thus, bending forces in the mirror can be substantially eliminated. Also, resonant frequency considerations are determined mainly by the mass of the crystal material of the linear motion transducers and the amount of distributed mass loading from the mirror attributable to that individual stack. Thus, the size of the mirror is no longer a consideration as the scanning drive movement is applied in a distributed manner. The principles of the invention are equally applicable to angular deflection of curved surfaces as well as flat parallel plates.

It is therefore an object of this invention to provide a high speed deflection mirror.

It is a further object of this invention to provide a high frequency driver mirror having a very high resonant frequency, substantially independent of the gross mass of the mirror or of its mounting.

It is a still further object of this invention to provide a high speed small deflection interlace mirror that is balanced so as to not apply oscillating forces onto the support.

It is another object of this invention to provide a high speed small deflection interlace mirror for use with infrared detectors so as to reduce the number of required detectors or increase the angular coverage for a given number of detectors.

BRIEF DESCRIPTION OF THE DRAWINGS

The novel features of this invention as well as the invention itself, both as to method of organization and method of operation, will best be understood from the accompanying description taken in connection with the accompanying drawings, in which like reference characters refer to like parts, and in which:

FIG. 3 shows another detector array in accordance with the invention for explaining a four-to-one interlace operation;

FIG. 4 is a schematic plan view of the high speed mirror deflection system in accordance with the invention;

FIG. 5 is a sectional view taken at lines 5—5 of FIG. 4 showing the stacks of electro-strictive transducers for further explaining the high speed deflection mirror in accordance with the invention;

FIG. 6 is a schematic side view of a stack of electro-strictive transducers connected in parallel manner;

FIG. 7 is a schematic side view of a track of electro-strictive transducers connected in a combined parallel and series manner;

DESCRIPTION OF THE PREFERRED EMBODIMENT

Figure 1:
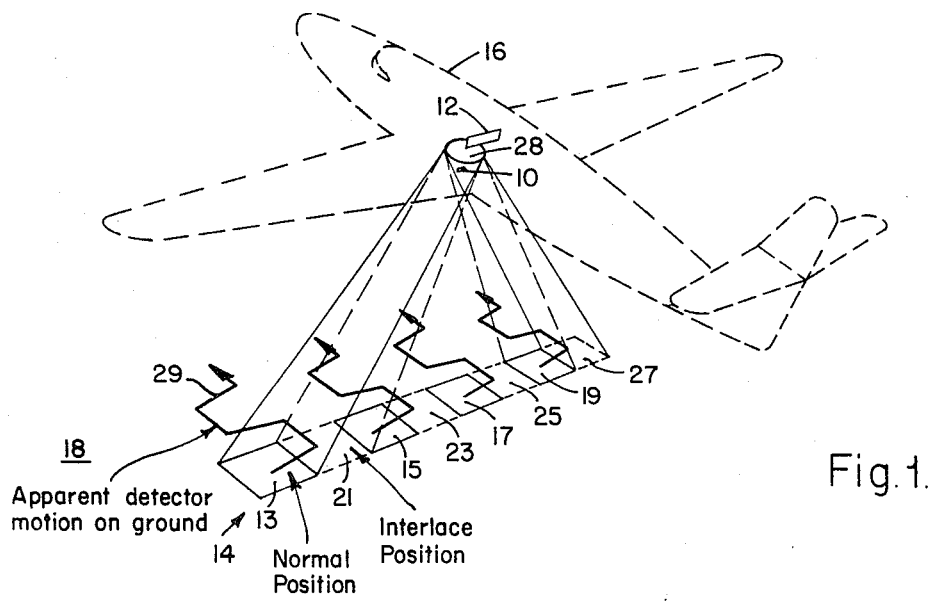
FIG. 1 is a schematic perspective diagram of an aircraft and a detector array utilized therein for illustrating the system for terrain scanning with a selected interlace, in which the high speed deflection mirror of the invention may be utilized.

Referring first to FIG. 1, a high frequency deflection mirror 10 in accordance with the principles of the invention is shown schematically to explain its relation to a detector array 12 and a reflective mirror structure 28, which mirror, array and mirror structure may be mounted near the bottom of an aircraft 16. The detector array 12 may include infrared detectors in the illustrated example in accordance with the invention. Portions of a ground area 18 after reflection from the reflective mirror structure 28 and the oscillating interlace mirror 10 is seen by the detector array 12. Because of the optics of the system, the ground area from which energy is received by the detector array is effectively equal to the area indication 14 which includes for the four detectors, respective projected fields of view 13, 15, 17 and 19 representing the normal position of the mirror 10. Dotted fields of view 21, 23, 25 and 27 represent the interlace position of the mirror 10. Arrow paths such as 29 indicate the apparent motion of each detector on the ground or surface being detected. It is to be noted that the frequency of interlace must be sufficiently high to sample each position of interlace at least once during the time it takes a point source to traverse the detector field of view, which is a function of the aircraft forward velocity. The forward motion of the aircraft 16 or a suitable forward scan system (not shown) provides the second dimension of movement to the overall scanning system. Energy rays between the reflective mirror 28 and the projected fields of view are shown to further indicate the relative relationship of the normal and interlace positions.

Figure 2:
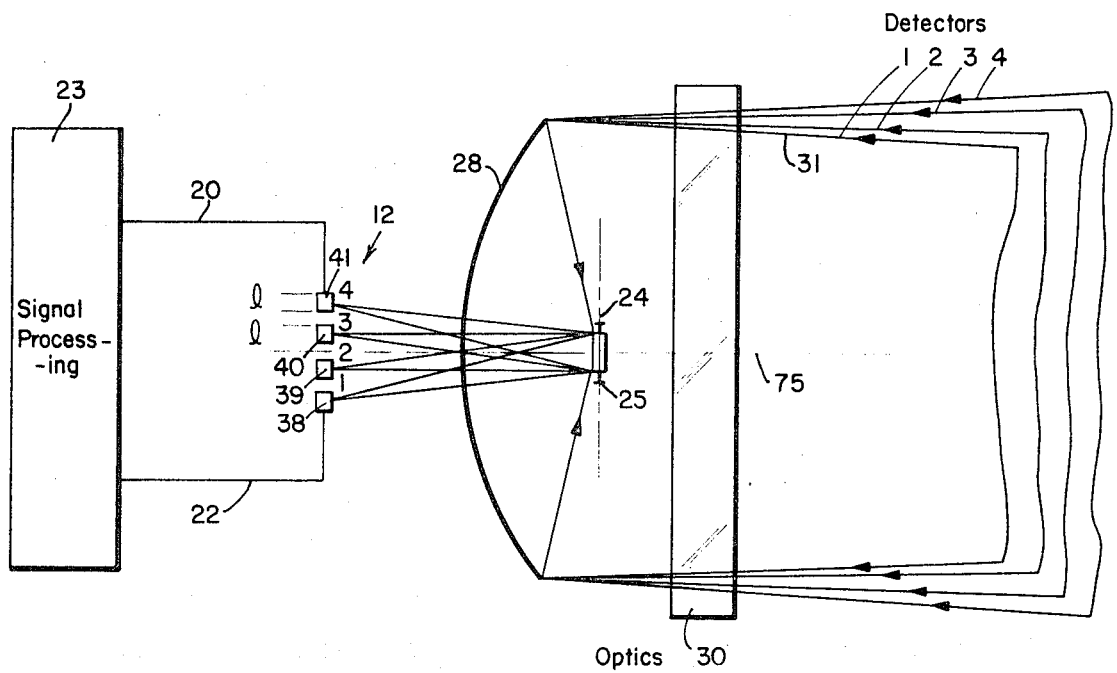
FIG. 2 is a schematic diagram showing the detector array and the high speed mirror in accordance with the invention for further explaining its interlace operation.

Referring now also to FIG. 2, the detector array 12 is shown with composite leads 20 and 22 which include pairs of leads from each detector that pass to a signal processing system 23. The mirror 10 which has surfaces that oscillate relative to a deflection plane 75 or approximately around an axis in a plane 24, is mounted on a mounting structure 25 to receive light passed through an optical structure 30 from the ground 18 and reflected from the parabollic reflector structure 28, to scan or oscillate so that the radiation from the normal and the interlace positions is passed to the detectors. Referring also to FIG. 1, when the mirror 10 is in a first or normal position, the projected field of view of each detector is shown by blocks 13, 15, 17 and 19 and the data is detected by the detectors 38, 39, 40 and 41 and applied to the signal processing unit 23. During the second period or mirror position, the detectors see or are responsive to the adjacent field of view indicated by 21, 23, 25 and 27 and this data is applied to the signal processing unit 23. The detectors 38, 39, 40 and 41 are spaced a distance $l$ apart for the two-to-one interlace so that when the mirror 10 is in the second position, the data previously detected in the fields of view 13, 15, 17 and 19 is projected on a blank portion of the array 12 so as to not be detected. For convenience of illustration in FIG. 2, the four beams of energy shown such as 31 for detector number 1 or detector 38 is for only the normal position of the mirror 10, and a position with a slightly different angle (not shown) would be received when the mirror 10 is in the interlace position. Although the energy beams are shown passing through the optical structure 30 to the reflector structure 38, it is to be understood that direction changes as well as focusing may be provided by the optical unit 30, as is well known in the art. The frequency of the oscillation or scanning of the mirror 10 must be sufficiently high to sample each interlace position at least once during the time it takes for a point source on the ground to traverse the forward moving detector field of view such as 13. The use of interlace scanning reduces the number of required detectors or improves the angular coverage that may be provided with a given number of detectors. It is to be noted that the principles of the invention are equally applicable to other interlace ratios such as 4:1 or 8:1 or any other desired ratio.

Referring now to FIG. 3 as well as to FIG. 2, a detector array 46 is shown for illustrating a four-to-one interlace including detector elements 48 through 51 each having a width $l$ and being separated by a width $3l$. The detected signal from the detectors 48 through 51 is passed through composite leads 62 and 64 to the signal processing unit 23 (FIG. 2). The field of each detector moves to four positions on the ground in response to four positions of the mirror 10. Thus as the detector 48 receives energy from the field of view in four sequential positions, the energy from the patch of ground in the first field of view position moves sequentially along the array from positions 1 to positions 2, 3 and 4, then restarting the sequence, for example. The detector 48 then receives energy from four different and adjacent positions on the ground as the mirror 10 assumes four positions. The rate of sampling which corresponds to the rate of deflection mirror position change must be such as to sample each ground space at least once during the period a point source of predetermined size travels through the detector field of view in the direction of aircraft travel. A four-to-one interlace allows use of an array with one fourth of the number of detectors for the same ground width to be scanned, or allows scanning of a greater angle for an array with the same number of detectors.

Referring now to FIGS. 4 and 5, the high speed interlace mirror 10 is shown in greater detail in accordance with the invention, having a mounting plate 67 mounted in the structure 25 at four points and having external plates 69 and 70 with respective mirror faces 66 and 68. The plates 69 and 70 may be of any suitable rigid material such as berrillium or steel or any rigid metallic or nonmetallic material or combination of material polished after assembly, having a circular configuration and being of equal size and configuration. The mounting plate 67 may be of any suitable rigid structure such as berrillium or steel or any rigid metallic or nonmetallic material or combination of material and may have holes therein for electrical conductors, if desired. The plates 69 and 70 as well as the mounting plate 67 may be of any desired shape such as circular, elipsoidal, square, rectangular or any other symmetrical shape, in accordance with the invention. Also, the mounting structure may contact the plate 67 at any desired number of points such as three or continuously in some arrangements in accordance with the invention. To assure a balanced structure, both plates 69 and 70 have similar surface polish characteristics, although only the surface 66 is utilized in the system of FIGS. 1 and 2. The mounting plate 67 is positioned between the plates 69 and 70 so that a balanced system is provided around a structure neutral plane 24 formed by the plate 67. Each plate 69 and 70 may be considered to have a respective neutral axis 77 and 79 through a mirror neutral plane 75, which are zero motion axes around which the respective plate rotates. The plane 24 may be generally considered the neutral plane of the structure and the plane 75 may be considered the neutral plane of mirror movement from the plane 24. The surface 66 may be divided into a left-half portion 72 and a right-half portion 74. A power source 76 and a synchronizer source 78 are coupled to a pulse forming circuit 79 which provides driving pulses to composite leads 80 and 81 which pass to the left-half portion 72 and composite leads 82 and 83 which pass to the right-half portion 74. Positioned between the two plates 69 and 70 are a left-array 88 and a right-array 89 of stacks of transducers, which arrays are symmetrical relative to the mirror neutral plane 75.

Referring now also to FIGS. 6 and 7, each array forms a honeycomb sandwich of rows R-1 to R-6 on both sides of the axis 24, of stacks such as stacks 100 to 111, each stack including electro or magnetostrictive transducers such as 124 to 128 of the stack 100 and such as 115 to 124 of the stack 105. The stacks 100 to 111 in FIG. 4 indicate partial stacks 100a to 111a in the top half of the array and partial stacks 100b to 111b in the bottom half of the array as shown in FIG. 5. The electro or magnetostrictive transducers may be of any suitable material such as, for example, barium titanate, strontium titanate or lead zircanate for electrostrictive transducers or such as, for example, nickel or nickel alloy (with the current applied to suitable coils to generate a magnetic field) for the magnetostrictive transducers. The transducers may be responsive to the current or field direction and magnitude to either expand or contract in linear dimension along the length of the stack between the two plates 69 and 70. The requirement for the transducers is thus a material that is responsive to either a voltage differential or a current differential to change dimensions.

In one arrangement, in accordance with the invention, the electro or magnetostrictive stacks of transducers are connected in parallel such as in the stack 100 so that the voltage applied to leads 140 and 142 is applied between the entire stack of elements which may be 30, for example. The transducers such as 128 and 129 are separated by a suitable insulator such as a ceramic material with conductive plates 146 and 148 on each side thereof in contact with the transducer material and connected to suitable conductor strips or leads. The stacks are suitably attached to the plates 69 and 70 such as by bonding with a suitable adhesive. Also, the transducers, insulators and conductive plates may be bonded together with any suitable adhesive. In another stack arrangement in accordance with the invention, the transducers may be connected in series to divide the voltage or partially connected in series and partially in parallel as shown by the stack 105. Transducers 115, 116, 117, 122, 123 and 124 are shown connected in series in the stack 105 and transducers 118, 119, 120 and 121 are shown connected in parallel in the stack 105. When constant level voltages are applied to all stacks, a parallel connection provides a fixed large voltage to each transducer while the series connection provides a fraction of the voltage to each transducer, thus providing a control of the amount of linear movement. Leads 150 and 152 apply a signal to the transducers of the stack 105. It is to be noted that for a balanced system, the stacks and transducer configuration is similar relative to the mirror neutral plane 75 for the array halves 88 and 89.

Figure 9:
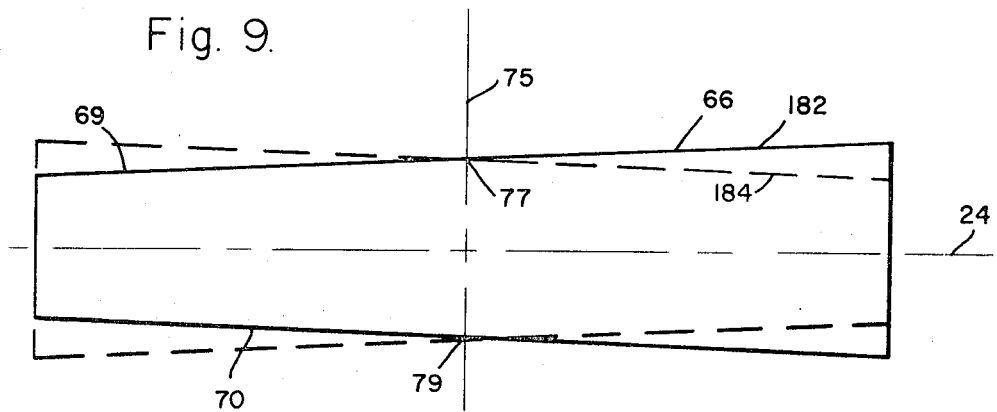
FIG. 9 is a schematic diagram showing the overall non-bending motion of the schematic mirror of FIG. 4.

Before further explaining the illustrative stack configuration, some of the factors that may be utilized in accordance with this invention to provide the controlled deflection of the plates 69 and 70 will be further explained. The stacks may be arranged relative to the mirror plane 75 so that deflection positions 182 and 184 of FIG. 9 are provided when the proper voltages are applied to each stack. Although in the illustrated arrangement, constant voltage amplitudes are applied to each stack (inverted voltages to the two halves 88 and 89 of the stack), it is to be understood that the invention is not limited to this arrangement, and different voltages may be applied to different stacks or groups of stacks within the scope of this invention. The transducer motion in a direction orthogonal to the surfaces of the plates 69 and 70 is proportional to the voltage per centimeter (in the direction orthogonal to the surfaces of the plates 69 and 70) times the length in the same direction of the crystal in centimeters. Thus, deflection is proportional to $V_T$, the total effective voltage along a stack. The total voltage $V_T$ for parallel connected crystals is equal to $n_P V_A$ where $n_P$ is the number of crystals in parallel in the stack and $V_B$ is the applied voltage. In order to prevent the plates from flexing and achieve true angular deflection, the total voltage $V_T$ is made proportional to the radius R with six rows R-1 to R-6 being selected for an illustrative example in the arrangement of FIG. 4. Assuming that the rows are at one inch intervals from the axis 24, the stacks of each of rows R-1 to R-6 have the same stack configuration in each row. The rows R-1 to R-6 are symmetrical on both sides of the plane 75 in the type of system where the axis of rotation is in the center of the plates. Also in the example, 200 volts per crystal is the selected maximum increment with 30 crystals selected per total stack such as 100 including both portions 100a and 100b. Calculations may be based on the entire stack or the upper and lower portion of the stack in accordance with the invention, giving consideration to the requirement of symmetry above and below the neutral plane 24. For the row R-6, all stacks thus require a $V_T$ of 6,000 so all 30 transducers are connected in parallel as indicated in FIG. 6. In row R-5, which requires a $V_T$ of 5,000 volts, 24 transducers are connected in parallel, two transducers are connected in series and five are left unconnected, for example. In row R-4, which requires a $V_T$ of 4,000 volts in each stack, 20 transducers are energized and 10 are unconnected, for example. In each stack of row R-3 for a $V_T$ of 3,000 volts, 14 transducers are connected in parallel, two transducers are connected in series and 15 transducers are unconnected, and in each stack of row R-2, 10 transducers are connected in parallel and 20 are unconnected. For row R-1 each stack may be connected as shown in FIG. 7 to provide a $V_T$ of 1,000 volts so that four transducers are connected in parallel, 26 transducers are connected in series (or two in series and 24 unconnected). It is to be noted that any suitable configuration of parallel and series transducers are unconnected transducers for the stack arrangements is within the scope of the invention.

The stacks as shown in FIG. 4, are offset horizontally between adjacent rows so that each stack controls substantially the same area of plate. The number and diameter of the stacks is selected or adjusted for a proper resonant structural frequency. The crystal resonant frequency controls the limit of the upper range of resonant frequency. The spacing of the stacks is selected for a desired resonant frequency by considering the distributed mass of the plate or plates allocatable to each stack plus the transducer distributed mass relative to the structure neutral plane 24. Dotted circles, 132, 133 and 134, of FIG. 4 show the plate area allocated to each linear motion transducer stack which is utilized to determine the spacing and transducer diameter for specified resonant frequency requirements, the resonant frequency being a function of the distributed mass of the transducer stack and the selectable distributed mass of the plates. Also, it is to be understood that in some arrangements in accordance with the invention, approximations may be required in both the connecting of the stacks and the positioning of the stacks to provide a desired plate motion without increasing the mass of any one stack unit appreciably.

It is to be noted that the mirror surface or surfaces being driven by the driving arrays 88 and 89 are not limited to a flat surface and, for example, doubly curved surfaces 172 and 174 shown dotted in FIG. 5, and which may be spherical or aspherical, may be provided (with proper selection of the stacks of electrostrictive transducers and the driving voltages) within the principles of the invention, such as for use in a cassegrain antenna or similar type system.

Figure 8:
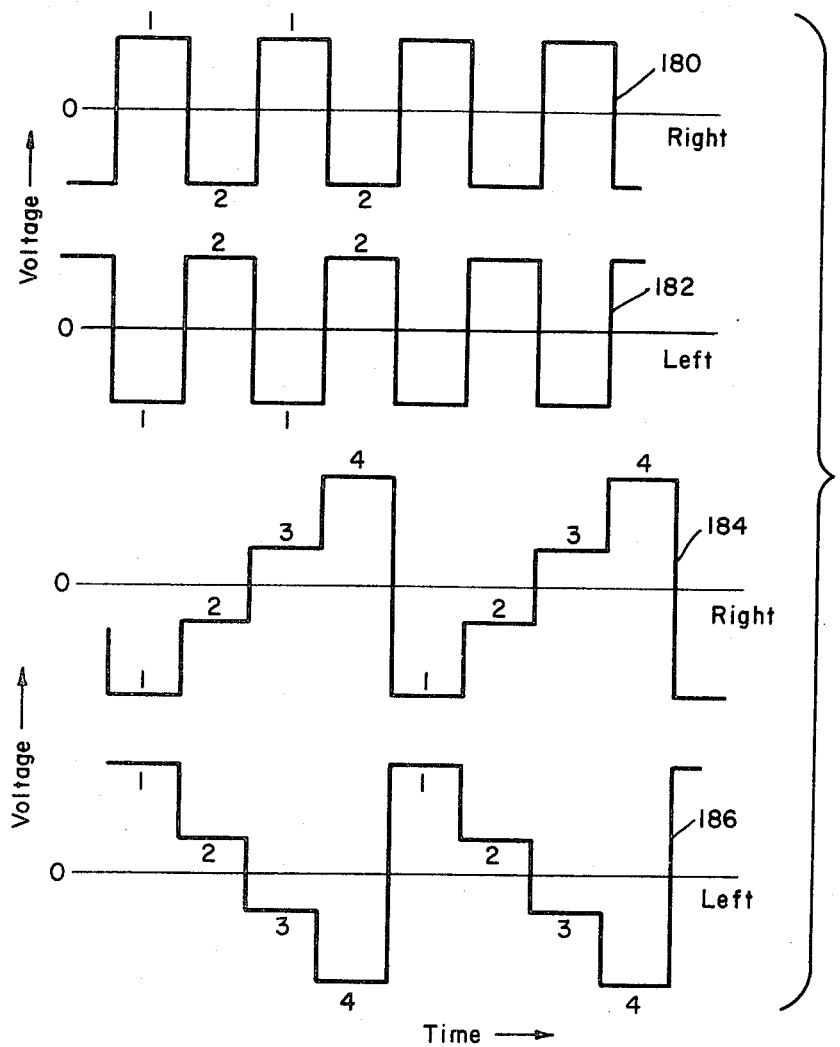
FIG. 8 is a schematic diagram of voltage as a function of time illustrating waveforms that may be utilized for driving the transducer stacks utilized in the system of FIG. 4.

Referring now to FIG. 8 as well as to FIGS. 4 and 5, voltage pulses of waveforms 180 and 182 may be utilized for the two-to-one interlace (illustrated in FIG. 2) with the pulses of the waveform 180 being applied to the leads such as 82 and 83 and in turn to leads such as 140, 142 and 150 and 152 of the right hand array 89, and with the pulses of the waveform 182 being applied to the leads such as 80 and 81 and to individual leads such as 140, 142, 150 and 152 of each stack in the left hand array 88. In the arrangement shown, one of the leads for each of the stacks may be grounded and the pulses of the waveforms 180 and 182 may be applied to the other lead of each stack. For the four-to-one interlace as explained relative to FIG. 3, pulses of waveforms 184 and 186 may be respectively applied to the right hand array 88 and to the left hand array 89. Thus, in the illustrated arrangement, the voltage pulses are applied to provide symmetry to the mirror, for instance, and similar stacks are used on both sides of the axis 24 with inverted driving pulses applied to different halves of the array. Dotted lines 190 and 191 illustrate that in some arrangements in accordance with the invention, a space may be provided for an electronic box to include the pulse forming and other required circuits.

It is to be understood that the principles in accordance with the invention include variations such as use of stacks of different materials, applying different voltages to different stacks, combinations of different materials and series and parallel connections, any suitable spacing to provide the desired configurations with a minimum of bending and the use of stacks of different types of material all connected in a similar manner such as series or in parallel or all connected in any desired combination of series and parallel.

Referring now also to FIG. 9, which shows two scan positions of the surfaces 66 and 68 for a two-to-one interlace, position 182 represents the positions of the surfaces as a result of the high or positive voltage being applied to the array 89 and the low or negative voltages being applied to the array 88, and a dotted position 184 represents the position of the surfaces as a result of high voltages being applied to the array 88 and relatively low or negative voltages being applied to the array 89. Because each stack has a mass that is a function of substantially only the crystal material and a predetermined area of the plates, the resonant frequency of the mirror structure is relatively high. Also, because the transducer or motor operates in a balanced manner, a relatively small amount of reaction forces are applied to the mounting structure 25. Although the illustrated system has the neutral plane 75 in the center of the plate, it is to be understood that the principles of the invention are applicable to a structure having the neutral axis on the edge or any desired position between the two edges.

Thus there has been described a compact interlace mirror and driver that produces essentially a square wave interlace with frequencies as high as several kilocycles or higher for relatively small deflection angles such as less than 50 microradians, for example. Because of the high resonant frequency of the mirror and because substantially no reaction forces are applied to the mounting structure 25 so as to require the support to have a high resonant frequency, the concept can be applied to large mirrors with substantially no penalty in speed of operation and is applicable to high interlace ratios such as four-to-one or higher. The resonant frequency is a function of the mass end loading area of each piezoelectric stack and the crystal mass and spring constant, rather than of the mass and parameters of the entire structure. Thus, the scan mirror of the invention moves to different positions without causing reactions against the support structure and at frequencies exceeding the flexure resonant frequencies of the scan mirror and of the support structure. Also, in accordance with the principles of the invention, the pulse forming circuit may be positioned inside the mirror around its neutral axis to provide a highly compact unit. Although the system is not to be limited to any particular voltage level, it has been determined that typical systems using crystals would operate with voltage levels between several hundred and several thousand volts. The transducers may be any suitable material such as an electrostrictive material with signals applied directly thereto in a series or parallel manner as with coils that are connected in series or in parallel or are capable of providing selected magnetic fields. The system makes possible the use of interlaced arrays for higher resolution pictures with the consequent reduction of detectors for the same angular coverage, to 50 percent in the claimed two-to-one interlace and to 25 percent for a four-to-one interlace. The principles of providing an oscillating surface are not to be limited to mirror scanning but are applicable to other uses where a high frequency oscillation is required.

What is claimed is:

1. A scanner comprising first and second plates having a symmetrical configuration relative to each other and a deflection plane orthogonal and through the surfaces of said plates, mounting means positioned in a plane between and parallel to said first and second plates, an array having first and second portions and positioned between said first and second plates and including a plurality of stacks of linear motion transducers arranged substantially symmetrical relative to said deflection plane, each stack having said first and second portions on opposite sides of said mounting mirror, and a source of pulses coupled to said linear motion transducers so that each stack controls movement of an area of each of said plates so that said first and second plates each move around a rotation axis included in said deflection plane.

2. An oscillating mirror system comprising first and second circular plates of a rigid material positioned with a selected space therebetween, said plates divided into first and second semicircular portions on opposite sides of a neutral plane perpendicular to the surfaces of said plates, a mounting plate positioned between and parallel to said circular plates substantially half way therebetween, first and second groups of stacks of transducer elements positioned between said first and second plates at said first and second portions respectively, said stacks positioned in each group in a preselected pattern symmetrical relative to said neutral plane, each stack having first and second portions positioned on opposite sides of said mounting plate, a source of pulses coupled to the stacks of said first and second groups to apply a first pulse pattern to said first group and a pulse pattern inverted with respect to said first pulse pattern to said second group, whereby said first and second plates are deflected by rotation around an axis through said neutral plane so that sequentially the first end has a substantially greater spacing between said plates than the second end and said second end has a substantially greater spacing between said plates than the first end.

3. The combination of claim 2 whereby transducer elements energizable by said source of pulses and substantially adjacent to first and second ends are connected in parallel and other transducer elements energizable by said pulses are connected with selected combinations of parallel and series connected transducer elements therebetween.

4. The combination of claim 3 whereby said transducer elements are electrostrictive elements and the voltage pulse patterns are symmetrical around a reference voltage with each of said transducers coupled to said reference voltage.

5. The combination of claim 3 whereby said transducer elements are magnetostrictive elements.

6. A high speed interlace mirror system for receiving energy from sources on a surface comprising first and second plates of a symmetrical configuration with respect to each other positioned at a predetermined distance apart with at least the surface of said first plate being polished to reflect energy received from said source, said first and second plates having a neutral plane through the center thereof and orthogonal to the surfaces thereof, means for mounting said first and second plates positioned in a mounting plane between and parallel to said first and second plates, a plurality of detectors arranged to receive reflected energy from the surface of said first plate, first and second groups of stacks of electrostrictive transducers positioned in a selected pattern respectively on opposite sides of said neutral plane between said first and second plates, said stacks having transducers therein selectively connected in parallel and in series with stacks arranged in a predetermined pattern symmetrical around said neutral plane, each stack having first and second portions respectively positioned on opposite sides of said mounting plane, a source of voltage pulses coupled to the stacks of said first and second arrays, said source of pulses applying a first pulse pattern to said first array and an inverted pulse pattern to said second array, said first pulse pattern and said inverted pulse pattern each having a plurality of voltage levels to define step positions for interlacing energy from different positions of said surface.

7. A high speed scan mirror mounted on a support structure comprising first and second plates positioned parallel to each other with the surface of at least one forming a mirror, said plates having a plane therethrough substantially perpendicular to the surfaces thereof, a mounting plate structure positioned parallel to and between said first and second plates and attached to said support structure, a plurality of electrically controlled first and second drive motor means respectively positioned between said first plate and a selected position of said mounting plate structure and said second plate and said selected position of said mounting plate structure adjacent to a selected area of both plates, so that each corresponding first and second motor means applies equal and opposite reactions to said mounting plate structure to cancel the reactions so that relatively small reactions are applied to said support structure.

8. A controllable structure comprising first and second plates of a rigid material positioned substantially parallel to each other, a mounting plate positioned parallel to and between said first and second plates, an array formed of a plurality of stacks of transducers positioned between said first and second plates with each stack having first and second longitudinal sections having controllable lengths, and each contacting a selected position of said mounting plate each for controlling the distance between said first and second plates and said mounting plate of a selected area of said first and second plates, and a source of control pulses selectively coupled to said stacks of transducers for controlling the lengths of said stacks so that each stack moves its corresponding area of said first and second plates so that said first and second plates move to predetermined relative positions with the corresponding first and second longitudinal section of each stack applying equal and opposite reaction forces to said mounting plate.

9. The combination of claim 8 in which said array has first and second halves each corresponding to half of the surfaces of said first and second plates and said source of pulses applies a first pulse pattern to a first half of said array and a second pulse pattern inverted with respect to said first pulse pattern to a second half of said array.

10. The combination of claim 9 in which the transducers are selectively coupled to said source of pulses in series and in parallel.

11. A scanner comprising first and second plates having a symmetrical configuration with respect to each other and positioned parallel to each other, at least one of said plates having a reflective surface, a mounting plate positioned equal distance between and substantially parallel to said first and second plates, a support structure coupled to said mounting plate, an array positioned between said first and second plates with a first portion between said first plate and said mounting plate and second portion between said second plate and said mounting plate, the first and second portions of said array formed of a plurality of stacks linear motion transducer elements being individually controllable to vary in length between said first and second plates, said arrays being positioned so that corresponding stacks of said first and second portions contact corresponding portions of said mounting plate, and a source of pulses coupled to the first and second portions of said array for controlling the transducer means so that said first and second plates move with a substantially linear variation of distances between corresponding points and for applying equal and opposite forces to said mounting plate for cancelling said forces and transferring a minimum of forces to said support structure.

* * * * *